(12) United States Patent
Jenkins

(10) Patent No.: US 7,864,221 B2
(45) Date of Patent: Jan. 4, 2011

(54) WHITE BALANCE FOR VIDEO APPLICATIONS

(75) Inventor: Michael V. Jenkins, Buda, TX (US)

(73) Assignee: LifeSize Communications, Inc., Austin, TX (US)

( * ) Notice: Subject to any disclaimer, the term of this patent is extended or adjusted under 35 U.S.C. 154(b) by 789 days.

(21) Appl. No.: 11/405,354

(22) Filed: Apr. 17, 2006

(65) Prior Publication Data

US 2006/0262333 A1 Nov. 23, 2006

Related U.S. Application Data

(63) Continuation-in-part of application No. 11/107,401, filed on Apr. 15, 2005.

(60) Provisional application No. 60/619,210, filed on Oct. 15, 2004.

(51) Int. Cl.
H04N 9/73 (2006.01)
(52) U.S. Cl. .................... 348/223.1; 396/225
(58) Field of Classification Search ................. 358/1.12
See application file for complete search history.

(56) References Cited

U.S. PATENT DOCUMENTS

| | | | |
|---|---|---|---|
| 3,542,947 A | 11/1970 | Thurston | |
| 4,264,928 A | 4/1981 | Schober | |
| 5,038,216 A | 8/1991 | Easterly et al. | |
| 5,347,599 A | 9/1994 | Yamashita et al. | |
| 5,528,274 A | 6/1996 | Hyodo | |
| 5,528,740 A | 6/1996 | Hill et al. | |
| 5,537,157 A | 7/1996 | Washino et al. | |
| 5,579,053 A | 11/1996 | Pandel | |
| 5,617,539 A | 4/1997 | Ludwig et al. | |
| 5,629,734 A | 5/1997 | Hamilton et al. | |
| 5,654,759 A | 8/1997 | Augenbraun et al. | |
| 5,661,525 A | 8/1997 | Kovacevic et al. | |
| 5,689,641 A | 11/1997 | Ludwig et al. | |
| 5,692,159 A | 11/1997 | Shand | |
| 5,719,540 A | 2/1998 | Takaoka et al. | |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Jason Chan
*Assistant Examiner*—Yih-Sien Kao
(74) *Attorney, Agent, or Firm*—Meyertons Hood Kivlin Kowert & Goetzel, P.C.; Jeffrey C. Hood

(57) ABSTRACT

In some embodiments, images for the video conference may be white balanced. White balancing may include dividing at least a subset of an image's pixels into multiple ranges according to their luminance and chrominance values. For example, at least a portion of the pixels in an image may be sorted into different groups (i.e., by incrementing counters respective to each group) according to the luminance and chrominance values of the pixels. If enough pixels are found to be in a particular group, a portion or all of the image may be adjusted by a ratio corresponding to that particular group. For example, blue and red analog gains (corresponding to the selected pixels) may be modified by a corresponding ratio to bring red and blue accumulations closer to green accumulations.

21 Claims, 7 Drawing Sheets

U.S. PATENT DOCUMENTS

| | | | |
|---|---|---|---|
| 5,751,338 | A | 5/1998 | Ludwig, Jr. |
| 5,757,424 | A | 5/1998 | Frederick |
| 5,831,666 | A | 11/1998 | Palmer et al. |
| 5,832,143 | A | 11/1998 | Suga et al. |
| 6,043,844 | A | 3/2000 | Bist et al. |
| 6,173,069 | B1 | 1/2001 | Daly et al. |
| 6,301,370 | B1 | 10/2001 | Steffens et al. |
| 6,377,702 | B1 * | 4/2002 | Cooper ................. 382/167 |
| 6,563,537 | B1 | 5/2003 | Kawamura et al. |
| 6,594,688 | B2 | 7/2003 | Ludwig et al. |
| 6,614,474 | B1 | 9/2003 | Malkin et al. |
| 6,717,578 | B1 | 4/2004 | Deering |
| 6,809,358 | B2 | 10/2004 | Hsieh et al. |
| 6,816,904 | B1 | 11/2004 | Ludwig et al. |
| 6,850,565 | B2 | 2/2005 | Martins et al. |
| 6,965,705 | B1 | 11/2005 | Ma et al. |
| 7,035,481 | B2 | 4/2006 | Kim et al. |
| 7,038,709 | B1 | 5/2006 | Verghese |
| 7,088,392 | B2 | 8/2006 | Kakarala et al. |
| 7,130,446 | B2 | 10/2006 | Rui et al. |
| 7,202,904 | B2 | 4/2007 | Wei |
| 2002/0131635 | A1 * | 9/2002 | Cooper ................. 382/167 |
| 2003/0052978 | A1 * | 3/2003 | Kehtarnavaz et al. .... 348/223.1 |
| 2003/0174146 | A1 | 9/2003 | Kenoyer |
| 2004/0183897 | A1 | 9/2004 | Kenoyer et al. |
| 2004/0218837 | A1 * | 11/2004 | Shiyama ............... 382/305 |
| 2006/0082676 | A1 | 4/2006 | Jenkins et al. |
| 2007/0139517 | A1 | 6/2007 | Jenkins |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Elan Amir, Steven McCanne, and Hui Zhang; "An Application Level Video Gateway"; In Proceedings of ACM Multimedia '95; 1995; 18 pages.

"Polycom Demonstrates High Definition (HD) Video on Industry Leading VSX Video Communications Platform"; Apr. 26, 2005; 2 pages.

Tim Hewson, Cliff McKnight, Anne Clarke, and Peter Marsh; "Video Communication"; Desktop Video AGOCG Report; Feb. 24, 1999; 48 pages.

Bill Birney and David Workman; "Determining the Shape of Pixels and Frames"; May 2003; 15 pages; Microsoft Corporation.

Paul Bourke; "YCC colour space and image compression"; Apr. 2000; 7 pages.

Fredo Durand and Julie Dorsey; "Fast Bilateral Filtering for the Display of High-Dynamic-Range Images"; International Conference on Computer Graphics and Interactive Techniques; 2002; pp. 257-266.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Jefferson Han and Brian Smith; "CU-SeeMe VR Immersive Desktop Teleconferencing"; Proceeding of the Fourth ACM international conference on Multimedia; 1997; pp. 199-207.

Tohru Hoshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

D. Darian Muresan and Thomas M. Parks; "Optimal Recovery Demosaicing"; The IASTED Conference on Signal and Image Processing; 2002; 6 pages.

Roderick E. Perkins; "Spider: Investigation in Collaborative Technologies and Their Effects on Network Performance"; Global Telecommunications Conference; Dec. 1991; pp. 2074-2080; vol. 3.

Nicolas Roussel and Michel Beaudouin-Lafon; "VideoSpace: A Toolkit for Building Mediaspaces"; 1999; 11 pages.

Fred Sammartino and Dean Blackketter; "Desktop Multimedia Communications—Breaking the Chains"; 1991; 5 pages; Advanced Technology Group Apple Computer, Inc.

Scott R. Sharer; "What-Is 'HD'/'Hi-Def'"; Tandberg presentation; Aug. 2005; 43 pages.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"Polycom Executive Collection"; Jun. 2003; 4 pages; Polycom, Inc.; Pleasanton, CA.

U.S. Appl. No. 11/461,635, entitled "Dual Sensor Video Camera", by Michael V. Jenkins, filed Aug. 2006.

Joe Duran and Charlie Sauer; "Mainstream Videoconferencing—A Developer's Guide to Distance Multimedia"; Jan. 1997; pp. 228-230; Addison Wesley Longman, Inc.

* cited by examiner

WHITE BALANCE FOR VIDEO APPLICATIONS

PRIORITY

This application is a continuation in part of U.S. patent application Ser. No. 11/107,401 titled "Automatic Backlight Compensation and Exposure Control", which was filed Apr. 15, 2005, whose inventors are Michael V. Jenkins and Bradley Richard Ree (which claims benefit of priority to provisional application Ser. No. 60/619,210 titled "Video Conference Call System" filed on Oct. 15, 2004, whose inventors are Jonathan W. Tracey, Craig B. Malloy, Michael L. Kenoyer, Michael V. Jenkins, Ashish Goyal, and Michael J. Burkett) which is hereby incorporated by reference in its entirety as though fully and completely set forth herein.

BACKGROUND OF THE INVENTION

1. Field of the Invention

The present invention relates generally to video and, more specifically, to image enhancement.

2. Description of the Related Art

Images in video conference calls may suffer from exposure and/or white balance problems. Exposure problems may be caused by too much or too little light being received through the camera. White balance problems may be caused by incorrect ratios of colors in the image. Correct exposure may be more difficult to achieve than white balance, because white balance may be easier to fix than exposure after the image is acquired.

Gray world algorithms and specular reflection algorithms are two categories of white balance algorithms. Gray world algorithms may look for approximately the same amount of color in Red Green Blue (RGB) space (or equal Cb and Cr in YCC space) and adjust for any offsets. In YCC space, Y is a measure of luminance (intensity of light per unit area), Cb is a measure of blue chrominance (luminance minus blue), and Cr is a measure of red chrominance (luminance minus red). Specular reflection models may assume that the brightest spots in an image reflect the light source neutrally and may adjust the spectrum of the image accordingly. Both gray world algorithms and specular reflection models have disadvantages that may result in poor image quality.

SUMMARY OF THE INVENTION

In some embodiments, images for the video conference may be white balanced and/or exposure controlled. In some embodiments, pixels of interest may be used for determining a proper exposure correction and/or white balancing an image. Pixels of interest may include pixels identified with movement in the image, identified with skin portions in the image, identified with portions of the image closest to the camera, identified with pixels corresponding to a speaking participant, and/or identified with warm portions of the image. In some embodiments, the pixels for the image may be adjusted based on the exposure correction determined for the pixels of interest.

In some embodiments, the exposure correction may be determined by calculating a skew and a predicted peak, and then modifying the exposure based on the calculated predicted peak. In some embodiments, a skew of the luminance values of at least a portion of the image may be calculated, and if the skew is above a predetermined value, a predicted peak value may be calculated according to a first formula. If the skew is not above a predetermined value, the predicted peak value may be calculated according to a second formula. In some embodiments, if the predicted peak value is less than a predetermined low predicted peak value, an exposure of the image may be increased, and if the predicted peak value is more than a predetermined high predicted peak value, the exposure of the image may be decreased.

White balancing may include dividing an image's pixels into multiple ranges according to their luminance and chrominance values. In some embodiments, a video image may be enhanced by modifying blue and red analog gains to bring red and blue accumulations closer to green accumulations. In some embodiments, luminance values for an image may be adjusted by increasing or decreasing exposure. The decision whether to increase or decrease the exposure may be made by looking at statistics for luminance values of skin colored regions if there are sufficient skin colored regions on the image. Otherwise, luminance values for the entire image may be analyzed to determine whether to increase or decrease exposure.

BRIEF DESCRIPTION OF THE DRAWINGS

A better understanding of the present invention may be obtained when the following detailed description is considered in conjunction with the following drawings, in which.

Figure 1:
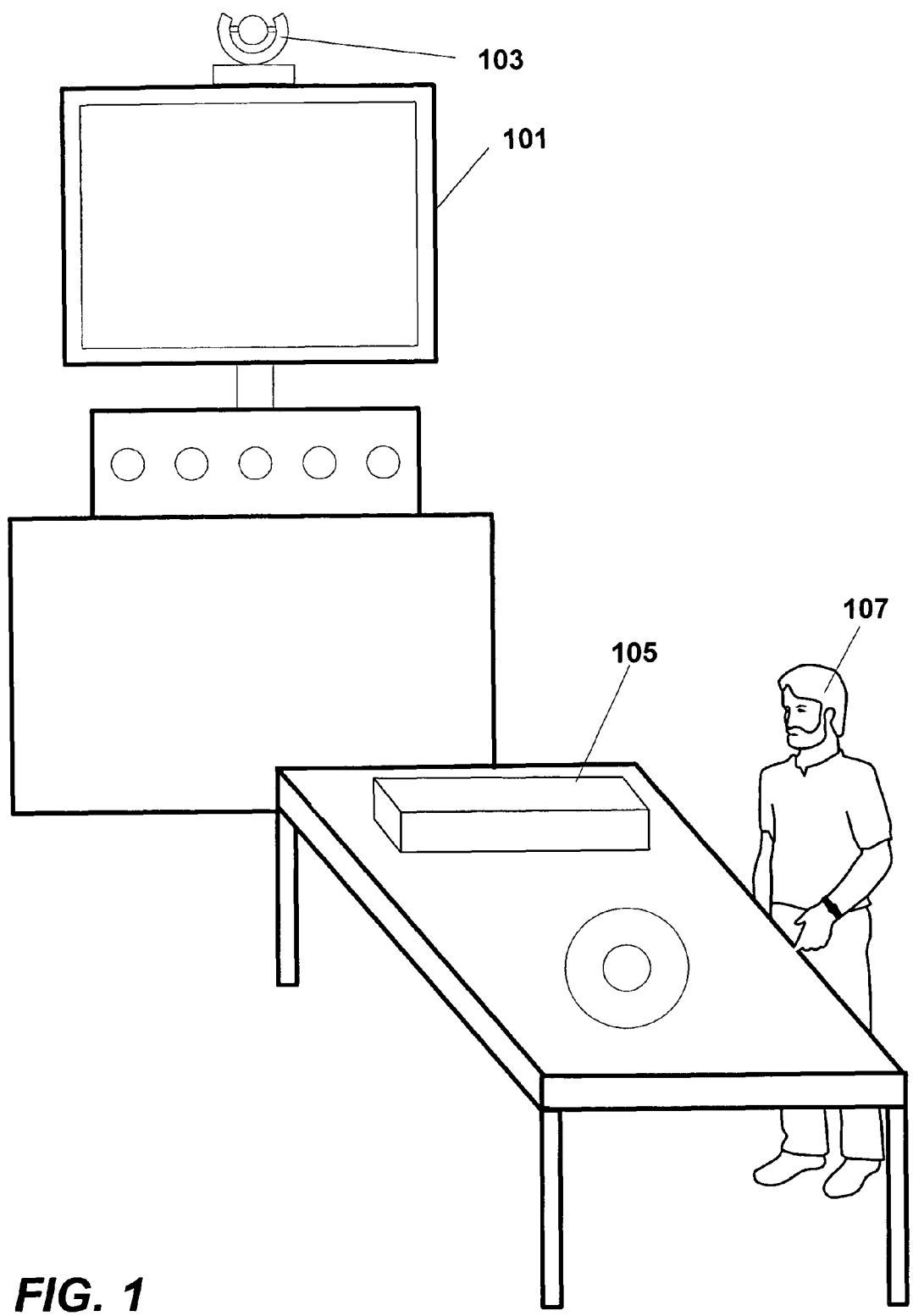
FIG. 1 illustrates a video conference system, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone, Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 illustrates an embodiment of a video conference system. In some embodiments, a camera 103 may capture an image of conference participants (e.g., local participant 107). Images of other conference participants (e.g., from remote conference sites) may be displayed on the display 101. In some embodiments, the local image of the conference participant 107 may need to be white balanced and/or exposure controlled. In some embodiments, images from remote sites may also be enhanced. In some embodiments, image enhancement may be performed by electronics in the camera 103 and/or codec 105. The electronics may include circuitry, processors, memory, etc. for performing image enhancement.

Figure 2:
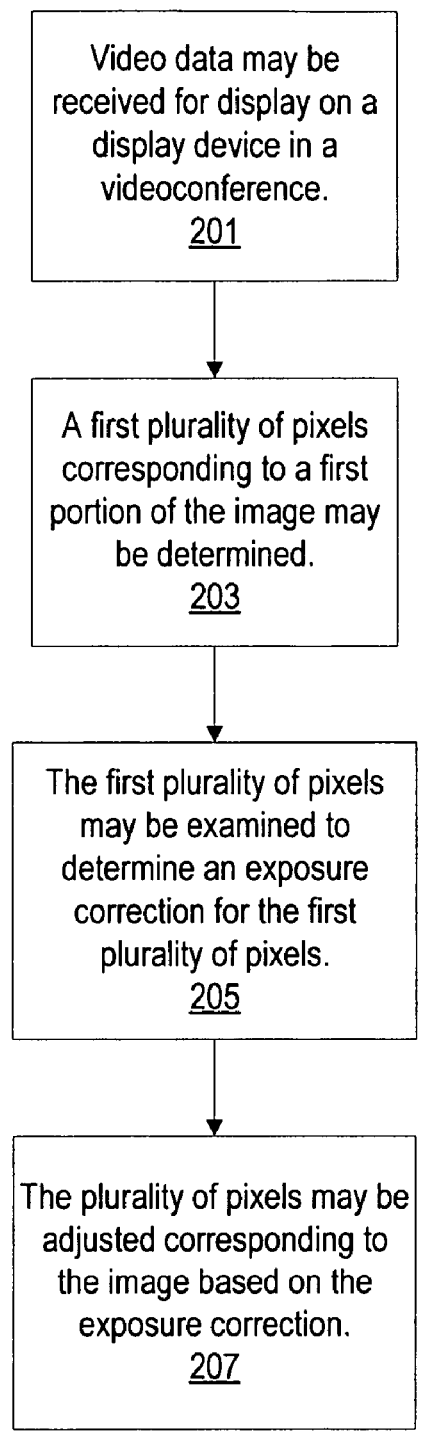
FIG. 2 illustrates a method for exposure control for an image in a videoconference, according to an embodiment.

FIG. 2 illustrates a method for exposure control for an image in a videoconference, according to an embodiment. It is noted that in various embodiments one or more of the method elements may be performed concurrently, in a different order, or be omitted. Additional elements may be performed as desired.

At 201, video data may be received for display on a display device in a videoconference. In some embodiments, the video data may include a plurality of pixels corresponding to an image. The image may be a portion of an image in a video stream. In some embodiments, the image may include multiple images and/or multiple portions of an image (e.g., multiple images in a chronological sequence may be considered together). The image may include at least one human participant image.

At 203, a first plurality of pixels corresponding to a first portion of the image may be determined. In some embodiments, the first plurality of pixels may be pixels of interest in the image. In some embodiments, the first plurality of pixels may be determined by determining which pixels of the image to exclude from consideration (e.g., pixels that are not of interest).

In some embodiments, the plurality of pixels may correspond to pixels of a moving object in the image. In some embodiments, algorithms (e.g., implemented in hardware and/or software) may be implemented to determine which pixels are of interest (e.g., correspond to a moving object). For example, in some embodiments, the algorithm may detect pixels corresponding to a moving object by looking for pixels changing luminance values more dramatically and/or more quickly than other pixels of the image.

In some embodiments, the first plurality of pixels may be pixels that correspond to skin portions of the human participant. For example, ranges of pixel values (depending on the color space used) may correlate more closely to human skin than other values. While dark skin and light skin may have different luminance values, in YCC space, they may have similar ranges of blue and red chrominance values.

In some embodiments, the first plurality of pixels may correspond to objects that are closest to the camera. For example, the pixels of an object closest to a camera may be determined using two or more cameras and the parallax effect. In some embodiments, measurement equipment may be used to detect the distance of objects from the camera (e.g., a laser and sensor). These distance measurements may be correlated with the pixels in the image and the first plurality of pixels may be designated as the pixels that correlate to the closest objects.

In some embodiments, a camera position relative to an array of microphones coupled to the videoconference system may be known, and the first plurality of pixels may be determined based on identified portions corresponding to one or more participants in the image who are speaking. The algorithm may correlate the positions of the participants who are speaking (e.g., determined through beamforming) relative to the camera to determine the first plurality of pixels.

In some embodiments, a temperature sensor (e.g., an infrared detector) may be coupled to the camera. The first plurality of pixels may be determined based on which pixels in the image correspond to warm portions of the image (i.e., which may correlate to human bodies that are usually warmer than their surroundings).

In some embodiments, the pixels in a certain portion of an image may be used for the first plurality of pixels. For example, the pixels in the center of the image may be used as the first plurality of pixels.

In some embodiments, other methods for finding pixels of interest may be used. In some embodiments, two or more methods may be used in conjunction. In some embodiments, a method for determining the pixels of interest may be stored and used to determine whether to use the same method on the next frame or whether to switch methods (e.g., the method may be switched if a sufficient number of pixels of interest is not found).

At 205, the first plurality of pixels may be examined to determine an exposure correction for the first plurality of pixels. For example, the luminance values of the pixels of interest may be analyzed to determine if there are luminance values above a predetermined upper limit. If not, the exposure correction may indicate that the exposure of the image needs to be increased. In some embodiments, if there are luminance values above the predetermined upper limit, then the pixels may be analyzed to determine if there are pixels below a predetermined lower limit. If not, the exposure correction may indicate that the exposure for the image needs to be decreased. In some embodiments, an average of the luminance values of the first plurality of pixels may be compared to a threshold to determine an exposure correction. In some embodiments, a histogram of the luminance values of the first plurality of pixels may be used to determine an exposure correction (e.g., the histogram may be compared to a predetermined histogram). The exposure correction may be based on a correction needed to make the current histogram match the predetermined histogram.

At 207, the plurality of pixels may be adjusted corresponding to the image based on the exposure correction. In some embodiments, the entire image may be adjusted based on the determined exposure correction.

Figure 3:
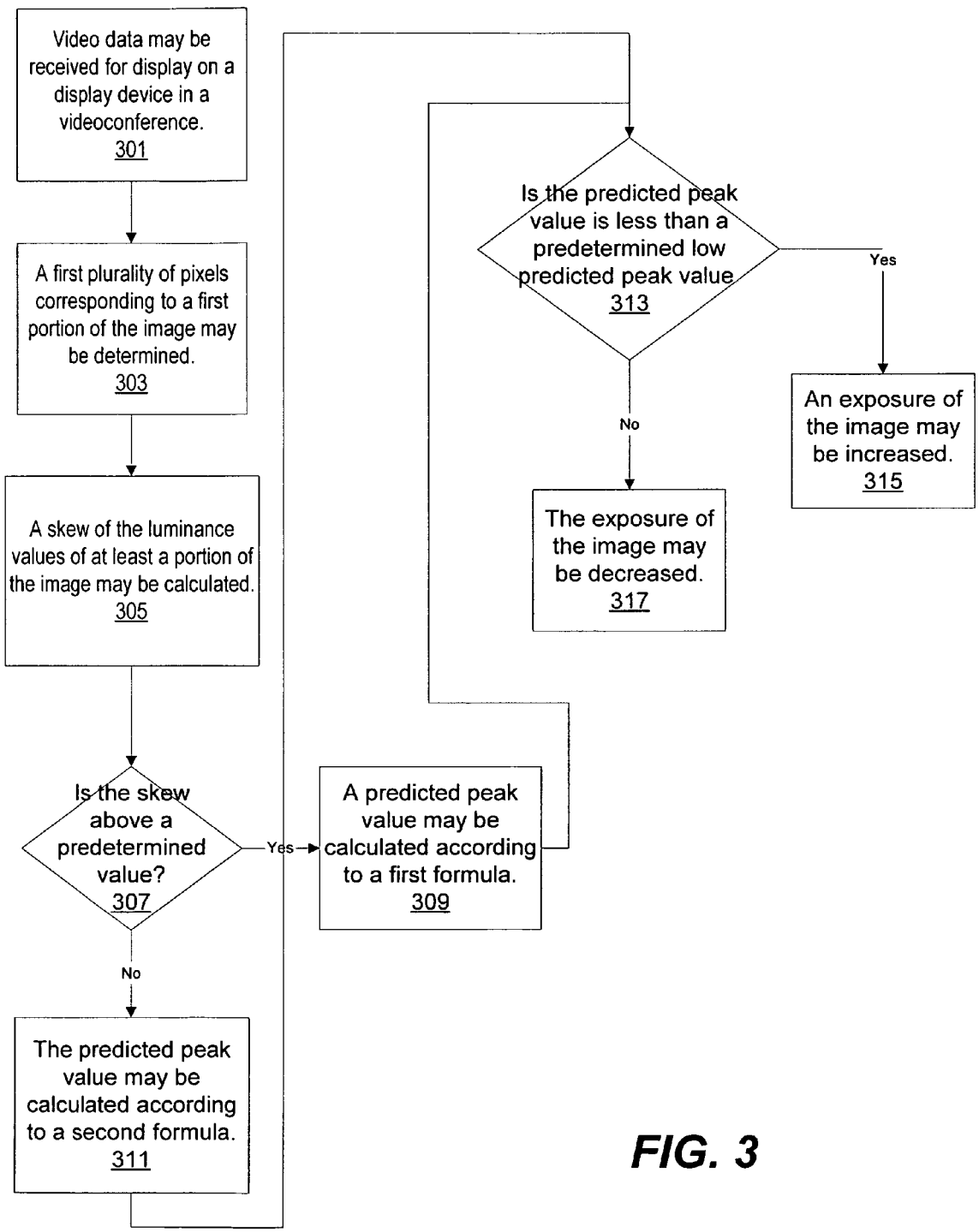
FIG. 3 illustrates a method for exposure control for an image, according to an embodiment.

FIG. 3 illustrates a method for exposure control for an image, according to an embodiment. It is noted that in various embodiments one or more of the method elements may be performed concurrently, in a different order, or be omitted. Additional elements may be performed as desired.

At 301, video data may be received for display on a display device in a videoconference. In some embodiments, the video data may include a plurality of pixels corresponding to at least one image. In some embodiments, the image may include at least one human participant image.

At 303, a first plurality of pixels corresponding to a first portion of the image may be determined. In some embodiments, the first plurality of pixels may include pixels of interest. In some embodiments, the first plurality of pixels may be based on identified skin portions of at least one human participant image. In some embodiments, each of the plurality of pixels may include a luminance value.

At 305, a skew of the luminance values of at least a portion of the image may be calculated. It is to be understood that the term "skew" as used herein refers to a measurement relative to the third standardized moment of the distribution of the pixel values. For example, the skew of the Y values may be calculated according to:

$$\text{skew} = (1/N)\left(\sum ((x_i - \bar{x})/s)^3\right)$$

Where standard deviation is calculated as:

$$\text{standard deviation} = \sqrt{\sum_N^i \frac{(x_i - \text{average})^2}{N-1}}$$

where N may be the total number of samples. Other calculations for standard deviation and skew may also be used. For example, skew may be calculated according to skew=(average−median)/standard deviation.

At 307 a determination may be made whether the skew is above a predetermined value.

At 309, if the skew is above a predetermined value, a predicted peak value may be calculated according to a first formula. In some embodiments, according to the first formula, the predicted peak value may be approximately an average of the luminance values minus a standard deviation of the luminance values times a skew of the luminance values (predicted peak value=average−(standard deviation*skew)). In some embodiments, the predicted peak value may not be a realistic luminance value.

At 311, if the skew is not above a predetermined value, the predicted peak value may be calculated according to a second formula. In some embodiments, according to the second formula, the predicted peak value may be approximately a total of the luminance values divided by the number of luminance values.

At 313, a determination may be made whether the predicted peak value is less than a predetermined low predicted peak value.

At 315, if the predicted peak value is less than a predetermined low predicted peak value, an exposure of the image may be increased.

At 317, if the predicted peak value is more than a predetermined high predicted peak value, the exposure of the image may be decreased.

Figure 4:
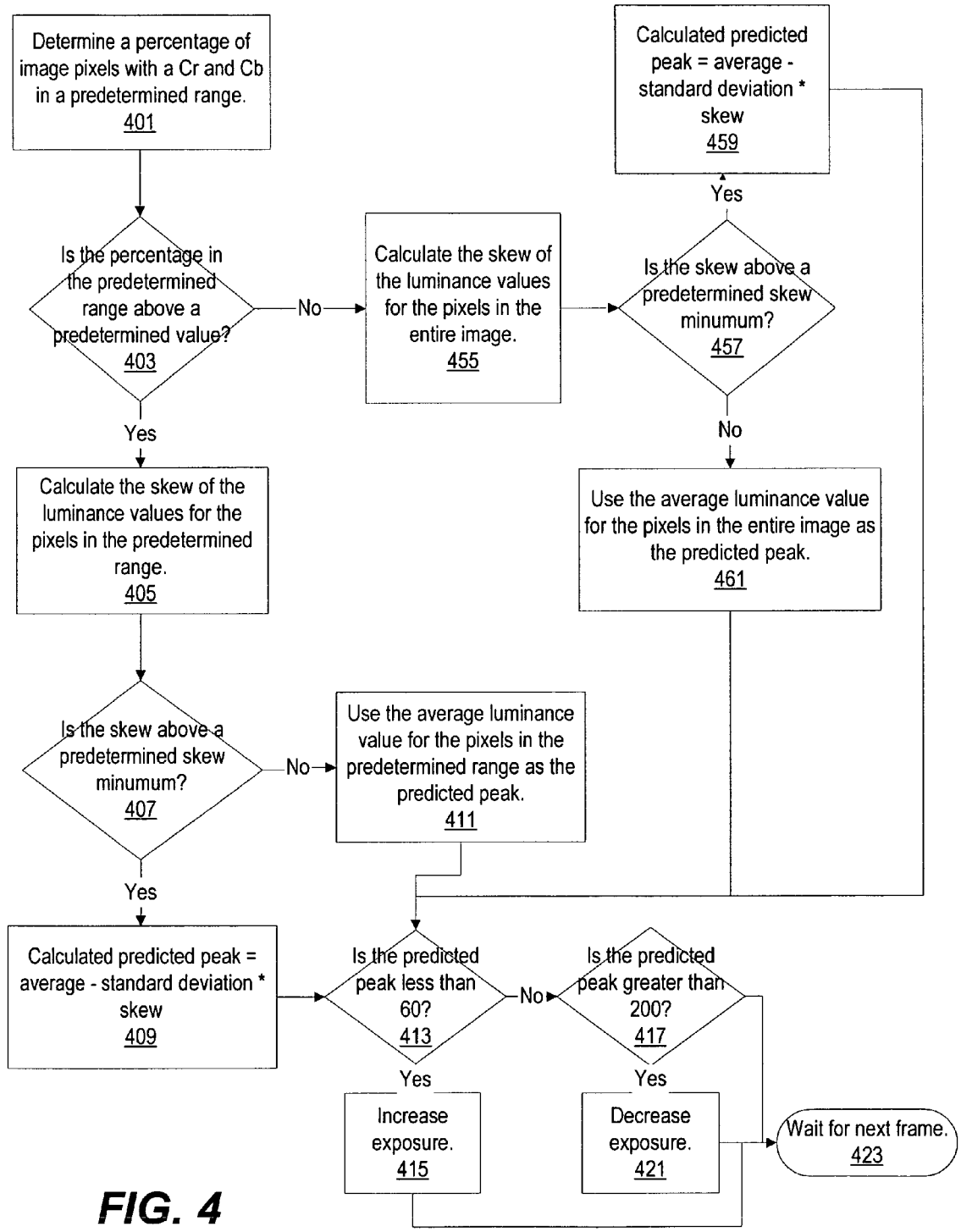
FIG. 4 illustrates a method for evaluating the exposure of an image using statistics of the Y values for the image, according to an embodiment.

FIG. 4 illustrates a method for evaluating the exposure of an image using statistics of the Y values for the image, according to an embodiment. In various embodiments, the Y values for the entire image or for only pixels of interest (e.g., skin colored pixels) may be evaluated. It is noted that in various embodiments one or more of the method elements may be performed concurrently, in a different order, or be omitted. Additional elements may be performed as desired.

At 401, a percentage of image pixels with red chrominance (Cr) and blue chrominance (Cb) in a predetermined skin range may be determined. In some embodiments, regions of the image with Cb between 75 and 128 and Cr between 130 and 170 may be considered skin colored.

At 403, if the percentage of image pixels Cr and Cb in the predetermined range is above a minimum skin percentage, at 405, a skew of the Y values for the pixels in the predetermined skin range may be calculated. In some embodiments, a minimum percentage of 5 percent may be used. Other percentages may also be used.

At 407, a determination may be made whether the skew is above a predetermined skew minimum. For example, a minimum skew of 0.5 may be used. Other skew minimums may also be used.

At 409, if the skew is above 0.5, the predicted peak value may be calculated according to a first formula (predicted peak value=average−(standard deviation*skew)). In some embodiments, other formulas may be used to calculate the predicted peak value.

At 411, if the skew is not above the skew minimum, an average Y (i.e., a second formula→predicted peak value=total of all Y values/number of Y values) for the pixels in the predetermined range may be used as the predicted peak value.

At 455, if the percentage of image pixels Cr and Cb in the predetermined range is not above a minimum percentage, the skew for the entire image may be calculated.

At 457, a determination may be made whether the skew calculated at 455 is above a predetermined skew minimum. For example, a skew minimum of 0.5 may be used.

At 459, if the calculated skew is above the predetermined skew minimum, the predicted peak value may be calculated according to the first formula:

predicted peak value=average−(standard deviation*skew)

At 461, if the calculated skew is not above the predetermined skew minimum, the average Y value (i.e., the second formula→predicted peak value=total of all Y values/number of Y values) for the entire image may be used as the predicted peak value.

At 413, if the predicted peak value is less than a predetermined low predicted peak value (e.g., 60), at 415, the exposure may be increased. In some embodiments, the image may be adjusted such that the Y values of the skin are spread over a reasonable range.

At 417, if the predicted peak value is greater than a predetermined high predicted peak value (e.g., 200), at 421 the exposure may be decreased.

At 423, the system may wait for the next frame.

In various embodiments, an auto exposure control may be used to adjust the Y values. In some embodiments, the auto exposure control may have two components to evaluate exposure and to modify exposure. Auto exposure control may manipulate several mechanisms to achieve proper exposure. In some embodiments, an aperture stop that controls light passing through the lens may be manipulated by the auto exposure control. For example, the aperture stop may be approximately in the range of f3.5 to f16. The wider the aperture stop is open, the more the depth of field is reduced. Reducing the aperture may increase the depth of field but may also let less light through. In some embodiments, integration time (i.e., how long light is allowed to accumulate on each pixel) may also be manipulated by the auto exposure control. The integration time may be extended as long as possible while achieving the required frame rate. Longer integration times may produce lower noise in the image, but may reduce frame rate. In some embodiments, to achieve 30 frames per second, a maximum desired integration time may be less than 33 milliseconds. In some embodiments, the auto exposure control may also manipulate gain in the amplifiers converting analog voltages into discrete binary values. In some embodiments, the analog gain may be approximately in the range of 1 to 15. However, in some embodiments, increasing the analog gain may amplify noise. The auto exposure control may also manipulate digital gain. Digital gain may also amplify noise.

Figure 5:
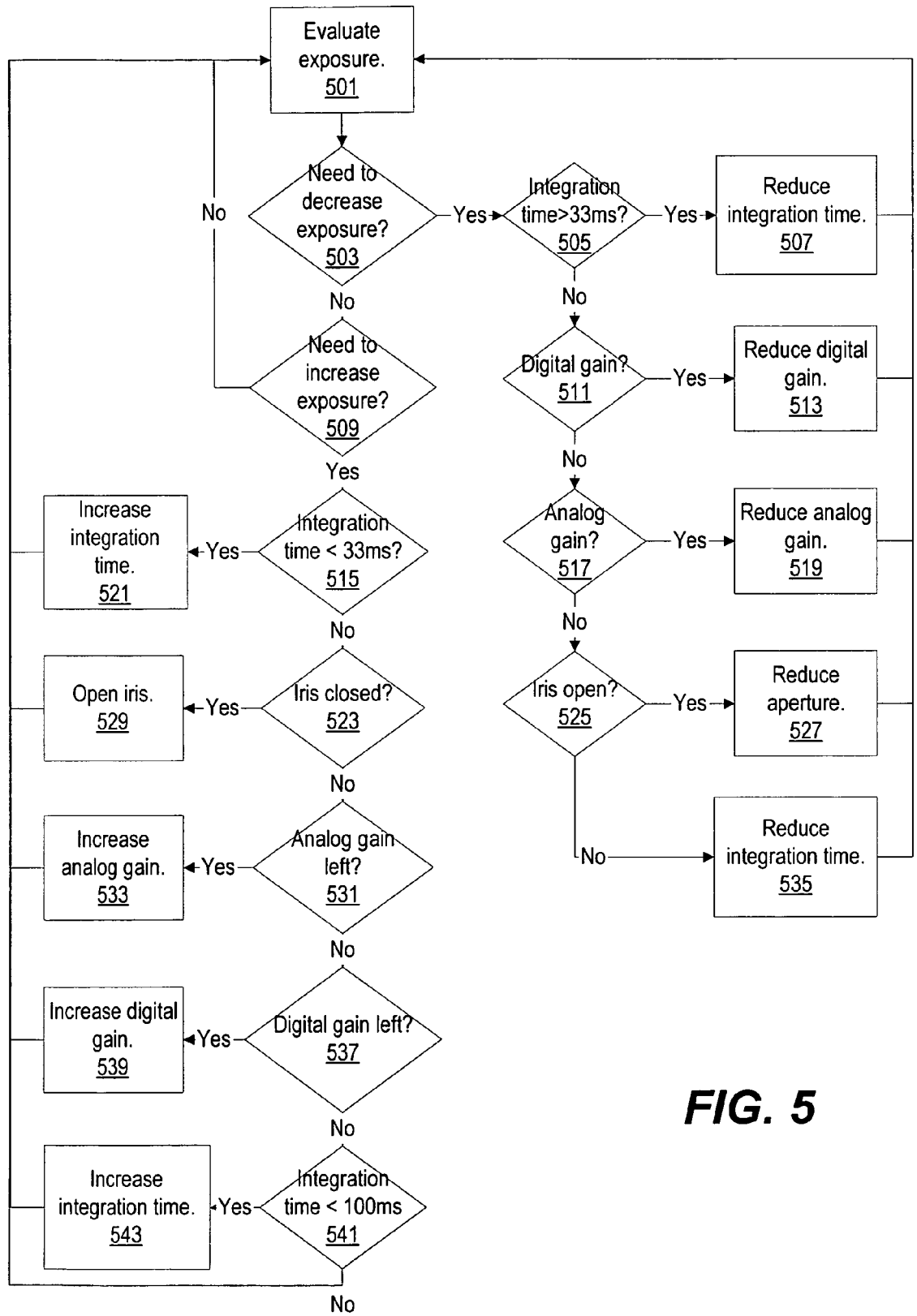
FIG. 5 illustrates a method for increasing or decreasing exposure, according to an embodiment.

FIG. 5 illustrates a method for increasing or decreasing exposure, according to an embodiment. It is noted that in various embodiments one or more of the method elements may be performed concurrently, in a different order, or be omitted. Additional elements may be performed as desired.

At 501, the exposure may be evaluated.

At 503, if the exposure needs to be decreased, several possible methods may be selected. In some embodiments, if a method is selected, after the method is applied, the flow may return to 501 where the exposure may again be evaluated. In some embodiments, one of the methods for adjusting exposure may be applied multiple times to the same image. In addition, multiple different methods to adjust exposure may be applied.

At 505, if the integration time is greater than a predetermined minimum integration time (e.g., 33 ms), the integration time may be reduced at 507.

At 511, if digital gain is available, the digital gain may be reduced at 513. The exposure correction may thus be accomplished through pixel gain.

At 517, if analog gain is available, at 519, the analog gain may be reduced.

At 525, if the iris is open, at 527, the aperture of the iris may be reduced.

If none of the above methods are available, or if the exposure still needs to be decreased after one or more of the above methods is applied, the integration time may be further reduced.

At 509, if the exposure needs to be increased, several possible methods may be selected.

At 511, if the integration time is below a predetermined minimum integration time (e.g., 33 ms), the integration time may be increased at 521.

At 523, if the iris is closed, at 529, the iris may be opened.

At 531, if there is analog gain left, at 533, the analog gain may be increased.

At 537, if there is digital gain left, at 539, the digital gain may be increased.

If none of the above methods are available, or if the exposure still needs to be increased after one or more of the above methods is applied, the integration time may be further increased if the integration time is less than a predetermined maximum integration time (e.g., 100 ms).

White Balance

In some embodiments, white balance control may include controlling a range of luminance values and a range of chrominance values for an image to be displayed in a conference call. In some embodiments, a variant of the gray world algorithm and the specular reflection model may be used. This may include identifying a likely light source in an image and correcting the luminance and chrominance values in the image. For example, a light source may include direct sun, clear sky, cloudy sky, incandescent lamps, or other lamps. Other light sources are also possible.

To white balance the image, a correcting algorithm may adjust an image by classifying the pixels of the image into different ranges according to characteristic values of the pixels. For example, if using a YCC color space, the pixels may be classified into different ranges of luminance (Y), blue chrominance (Cb), and red chrominance (Cr). Other color spaces may also be used. Then, depending on the percentage of pixels in each of the different ranges, the image may be corrected accordingly.

Figure 6:
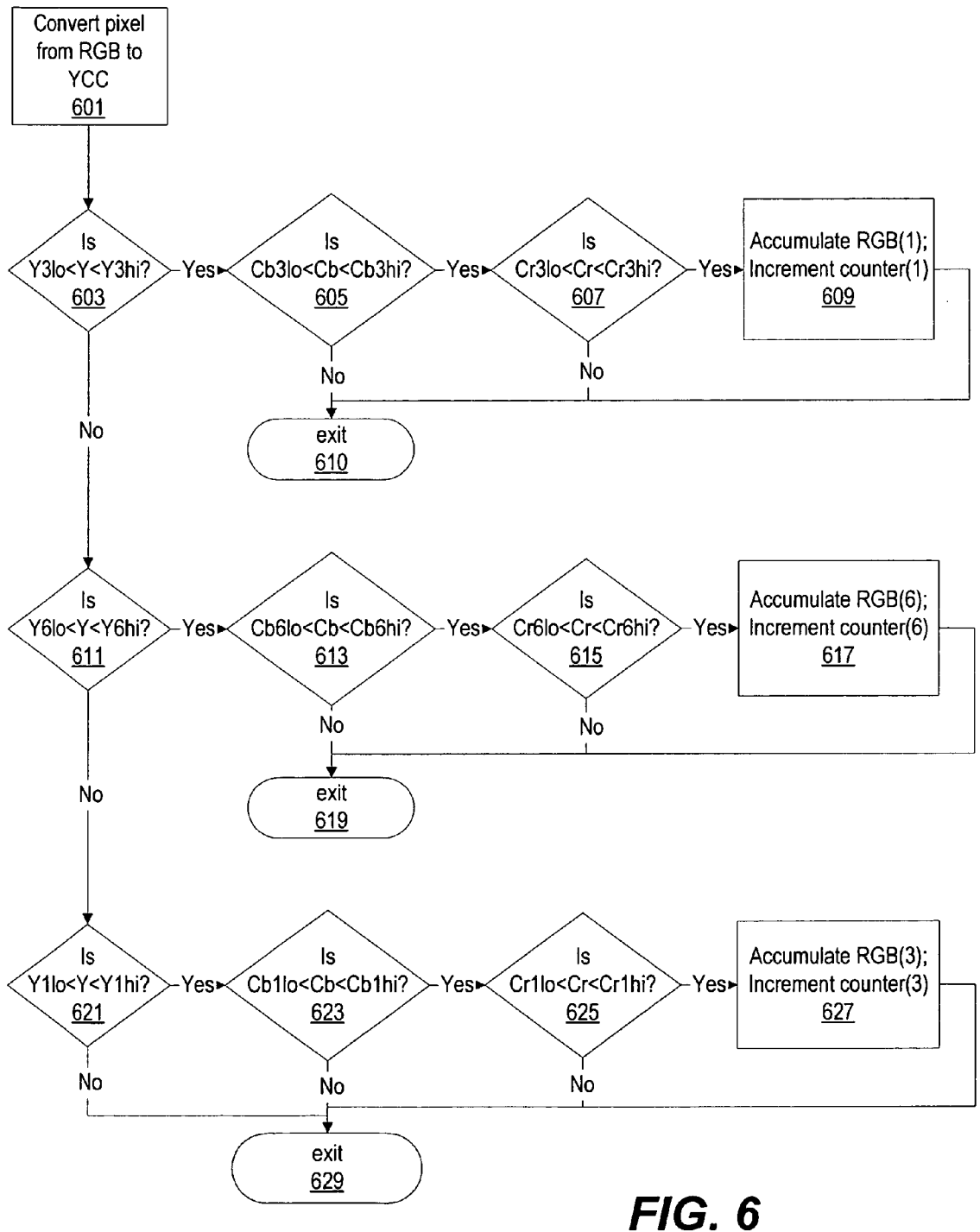
FIG. 6 illustrates a method for accumulating pixels in multiple accumulators, according to an embodiment.

FIG. 6 illustrates a method for accumulating pixels in multiple accumulators, according to an embodiment. It is noted that in various embodiments one or more of the method elements may be performed concurrently, in a different order, or be omitted. Additional elements may be performed as desired.

In various embodiments, the pixels may be classified into a bright, brighter, and brightest range. In some embodiments, other numbers of ranges may be used (e.g., four or greater or two or less). In some embodiments, each range may have a Y lower bound (e.g., Y1lo, Y2lo, and Y3lo) and a Y upper bound (e.g., Y1hi, Y2hi, and Y3hi). Each range may also have a Cb upper bound (Cb1hi, Cb2hi, and Cb3hi) and a Cb lower bound (Cb1lo, Cb2lo, and Cb3lo) for Cb, and a Cr upper bound (Cr1hi, Cr2hi, and Cr3hi) and Cr lower bound (Cr1lo, Cr2lo, and Cr3lo) for Cr. The pixels may thus be separated into three ranges (one range with the brightest pixels, then the next brightest pixels, and finally the least brightest pixels). Some pixels may not be in any of the three ranges. In some embodiments, each range may be assigned three accumulators (i.e., in the first range, one for luminance range Y1lo to Y1hi, one for Cb chrominance range Cb1lo to Cb1hi, and one for Cr chrominance range Cr1lo to Cr1hi). There may be a total of nine accumulators (3 more for the second range and three more for the third range). In some embodiments, other numbers of accumulators may be used.

In some embodiments, nine accumulators and three counters may be used to categorize the pixels of an image according to brightness and chrominance. Other numbers of accumulators and counters may also be used. In some embodiments, four register sets may be programmed by software to sort the pixels into the three acceptance ranges (e.g., (Y1, Cb1, Cr2), (Y2, Cb2, Cr2), and (Y3, Cb3, Cr3)). Other numbers of acceptance ranges and register sets may also be used.

In some embodiments, at 601, pixels may be converted from one color space to another (e.g., from RGB space to YCC space). The Y, Cb, and Cr may be compared to the three value ranges. In some embodiments, Y, Cb, and Cr may be provided as arbitrary numbers (e.g., relative to an exposure level of the image). At 603, the Y of the pixel may be compared to the Y3lo to Y3hi range (e.g., 210 to 230). Again, it is to be noted that the numbers 210 and 230 may be arbitrary and may be dependent on the current exposure of the image and the units used for Y, Cb, and Cr (or other color spaces if used). For example, a value may be assigned to black (e.g. 16) and another value assigned to white (e.g., 240) with intermediate values representative of the distance from the two extremes. If it has a Y in that range, at 605, the Cb of the pixel may be compared to the Cb3lo to Cb3hi range (e.g., 108 to 148). If the Cb of the pixel is in that range, at 607, the Cr of the pixel may be compared to the Cr3lo to Cr3hi range (e.g., 108 to 148). If the Cr of the pixel is in that range, each of the three accumulators (one for Y3, one for Cb3, and one for Cr3) may store their respective RGB value for the pixel. In addition, at 609, the counter for this set of ranges may be incremented by one.

If the Y of the pixel is not in the Y3lo to Y3hi range, at 611, it is compared to the Y2lo to Y2hi range (e.g., 170 to 210). If it has a Y in that range, at 613, it may be compared to the Cb2lo to Cb2hi range (e.g., 98 to 158). If the Cb of the pixel is in that range, at 615, it may be compared to the Cr2lo to Cr2hi range (e.g., 98 to 158). If the Cr of the pixel is in that range, each of the three accumulators (one for Y3, one for Cb3, and one for Cr3) may store their respective RGB value for the pixel. In addition, at 617, the counter for this set of ranges may be incremented by one.

If the Y of the pixel is not in the Y3lo to Y3hi range, at 621, it is compared to the Y1lo to Y1hi range (e.g., 130 to 170). If it has a Y in that range, at 623, the Cb for the pixel may be compared to the Cb1lo to Cb1hi range (e.g., 88 to 168). If the Cb of the pixel is in that range, at 625, the Cr of the pixel may be compared to the Cr1lo to Cr1hi range (e.g., 88 to 168). If the Cr of the pixel is in that range, each of the three accumulators (one for Y3, one for Cb3, and one for Cr3) may store their respective value for the pixel (which may be an RGB value). In addition, at 627, the counter for this set of ranges may be incremented by one. In some embodiments, pixels with Y below Y1lo or above the Y3hi may be ignored.

Figure 7:
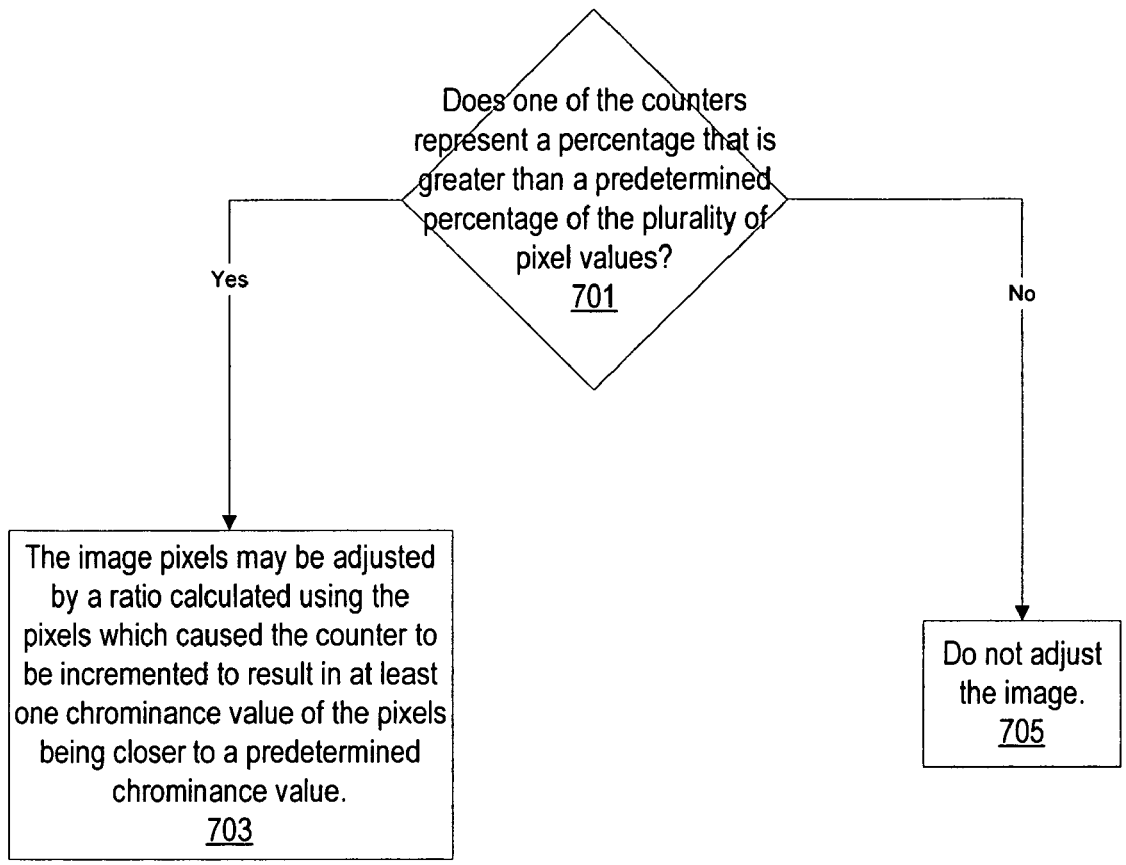
FIG. 7 illustrates a method for comparing a counter based percentage to predetermined percentages and adjusting the image accordingly, according to an embodiment.

FIG. 7 illustrates an embodiment of method for comparing a counter based percentage to predetermined percentages and adjusting the image accordingly. It is noted that in various embodiments one or more of the method elements may be performed concurrently, in a different order, or be omitted. Additional elements may be performed as desired.

At 701, a decision may be made whether one of the counters represents a percentage that is greater than a predetermined percentage of the plurality of pixel values. The counter divided by the number of the plurality of pixels (and then multiplied by 100) may form a percentage (i.e., the counter represents the percentage) to be compared to the predetermined percentage. In some embodiments, each of several counters (each for a different respective range) may be compared to respective predetermined percentages.

At 703, if one of the counters represents a percentage that is greater than a predetermined percentage, the pixel values for the plurality of pixels which incremented the counter may be used to calculate ratios to use in adjusting gains of the camera sensors (e.g., red gains, blue gains, etc.). The ratios may be applied to all of the pixels in the image (e.g., applied to all of the camera sensors) or may be applied only to the plurality of pixels which incremented the counter (e.g., by adjusting the gains of corresponding camera sensors). The ratios may also be applied to a different subset of the image pixels. The calculated ratio may result in at least one chrominance value of the pixels being closer to a predetermined chrominance value. In some embodiments, the ratio may be determined based on the pixels values which incremented the counter and/or may be determined based on which predetermined percentage was chosen (e.g., more or less adjustment may be used for the brighter/darker ranges).

At 705, if one of the counters does not represent a percentage that is greater than a predetermined percentage of the plurality of pixels, the image may not be adjusted.

For example, if a sufficient number of pixels (e.g., predetermined percentage of approximately 0.5%) are in the brightest Y range (e.g., approximately 210 to 230, chrominance between 108 and 148) those accumulations may be used (e.g., as an accepted range for use) to determine how much to adjust the pixels of the image in order to correct the white balance for the image (e.g., may be used in calculating the adjustment ratios). In some embodiments, the percentage may be determined using the counter for the range as compared to a total number of pixels for the image. A baseline percentage, e.g., 0.5%, may be predetermined for comparison to the percentage of pixels found in the brightest range. Other percentages may also be used. Because pixels in the brightest range should be the closest to white, the chrominance ranges for Cr and Cb may be relatively small with 128 (neutral) as the center. If there are not at least 0.5% of the pixels in this range, the next range (e.g., Y between 170 and 210, chrominance (for Cr and Cb) between 98 and 158) may be examined. Because this range is not as bright as the first range, a larger range (with 128 in the center) may be used for the chrominance because values in this range may be further from neutral. In some embodiments, more pixels may need to be present in this range (e.g., a baseline percentage of approximately 1%) for these pixels to be used for white balance (e.g., to determine the ratio(s) to use in adjusting camera sensor(s)). Other percentages may also be used for the comparison. In some embodiments, the last range may need approximately 2% (Y between 130 and 170, chrominance between 88 and 168). While examples of percentages have been provided, it is to be understood that the percentages may also be variable (e.g., the percentages may be adjusted based on image characteristics and/or factors such as previous image exposure of an image in the video stream with the current image).

If the percentages for these ranges are not exceeded, the software may do nothing. In some embodiments, if a percentage for one or more of the ranges is exceeded, the blue and red gains (e.g., analog and/or digital filters) of sensors for the camera may be modified by a ratio according to a ratio needed to bring red and blue accumulation values (of the pixels in the range corresponding to the exceeded percentage and/or for the whole image) closer to green. For example, if sensor values for the green sum is 56711, the red sum is 64379, and the blue sum is 48925 (e.g., corresponding to the pixels in the selected range), the image may have too much red, and not enough blue (i.e., white may have equal amounts of red, green, and blue). In some embodiments, the red gain may be adjusted by (56711/64379) or 0.8809, and the blue gain may be adjusted by (56711/48925) or 1.159. These ratios may then be applied to the whole image (e.g., to all of the camera sensors). Other ratios and calculations may also be used to adjust the gains.

In some embodiments, the sensors may be adjusted by other ratios. For example, the ratios may be dependent on which corresponding percentage was exceeded. In some embodiments, the amount of adjustment may be based on the values of Y and chrominance (stored in the accumulations) for the pixels in the accepted range. For example, in some embodiments, weights may be applied based on the percentage of pixels in a particular range and/or based on the actual values of Y and chrominance for pixels in a particular range. Other criteria may also be used. In some embodiments, this characterization of the image may be done when software sets a control bit. In some embodiments, one frame of data may be analyzed at a time. The counters and accumulators may be cleared at the start of each frame when the control is set.

In various embodiments, the distribution of Y values for an image may be evaluated to determine correct exposure. In some embodiments, a histogram of values for the image may be used to determine whether the image has proper exposure. For example, it may be desirable to have an image with Y values above 230 and/or values of below 40.

In various embodiments, the image exposure may need correction if Y values are not in certain ranges. For example, some video standards (e.g. BT656) may only allow certain ranges of Y values (e.g., between 16 (black) and 240 (white)). Other ranges may also be used. For example, 235 may be used for white. In some embodiments, the broader the range of Y values, the better the image. For example, an image with only values between 16 and 40 may be very dark, while an image with values between 200 and 240 may be very white.

In some embodiments, even when the image has Y values in a broad range of histograph bins (e.g., from 16 to 240), it may still need exposure modification. For example, backlighting may require modifying exposure even when the bins have reasonable values. Windows behind people in a conference room may provide more light than the lights in the room. This may cause a highly non-uniform distribution of Y values.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for adjusting an image by classifying pixels in the image into different ranges, comprising:
    storing a plurality of pixel values in a memory;
    comparing a first pixel value of the plurality of pixel values to at least one luminance range, wherein said comparing determines if the first pixel value is within the at least one luminance range;
    comparing the first pixel value to at least one chrominance range in response to determining that the first pixel value is within the at least one luminance range, wherein the at least one chrominance range is determined based on the at least one luminance range, and wherein said comparing determines if the first pixel value is within the at least one chrominance range;
    storing information indicating that the first pixel is within the at least one luminance range and the at least one chrominance range;
    wherein said steps of comparing and said storing information are performed a plurality of times for a plurality of pixel values;
    wherein the information indicates how many pixel values of the plurality of pixel values are within the at least one luminance range and the at least one chrominance range;
    determining whether the information indicates that greater than a predetermined percentage of the plurality of pixel values are in the at least one luminance range and the at least one chrominance range;
    adjusting, in response to determining that greater than the predetermined percentage of the plurality of pixel values are in the at least one luminance range and the at least one chrominance range, at least one pixel value in the memory by a ratio which results in at least one chrominance value of the adjusted pixel value being closer to a predetermined chrominance value.

2. The method of claim 1,
   wherein if the information does not indicate that a percentage of the plurality of pixel values that is greater than a predetermined percentage are in the at least one luminance range and the one or more corresponding chrominance ranges, no adjustment is made to the image based on the information.

3. The method of claim 1,
   wherein pixel values of the plurality of pixel values which are not in any of the plurality of luminance ranges are not used to adjust the image.

4. The method of claim 1,
   wherein pixel values of the plurality of pixel values which are in a luminance range of the plurality of luminance ranges but are not in at least one chrominance range corresponding to the luminance range are not used to adjust the image.

5. The method of claim 1, wherein the ratio is calculated using at least two sums of pixel values of the plurality of pixel values.

6. The method of claim 5, wherein adjusting at least one pixel value includes adjusting each pixel value in the image by adjusting a camera sensor by the calculated ratio.

7. The method of claim 6, wherein the ratio equals a green sum of the pixel values in the plurality of the pixels divided by a red sum of the pixel values in the plurality of pixels.

8. The method of claim 1, wherein the predetermined percentage is based on a percentage of the number of the plurality of pixel values.

9. The method of claim 1, wherein the predetermined percentage is based on a percentage of the total number of pixels in the image.

10. The method of claim 1, wherein the at least one luminance range comprises at least three luminance ranges.

11. The method of claim 1, wherein the at least one chrominance range comprises a blue chrominance range or a red chrominance range.

12. The method of claim 1, wherein the at least one luminance range and the at least one chrominance range are predetermined ranges.

13. The method of claim 1, wherein the information indicating how many pixel values of the plurality of pixel values are within the at least one luminance range and the at least one chrominance range comprises at least one counter and values of pixels which resulted in the at least one counter being accumulated.

14. The method of claim 1, wherein the predetermined percentage is calculated based on an exposure of a previous image in a video stream with the image.

15. A computer readable memory medium, comprising program instructions for adjusting an image by classifying pixels in the image into different ranges, wherein the program instructions are executable by a processor to:
   store a plurality of pixel values;
   compare a first pixel value of the plurality of pixel values to at least one luminance range, wherein said comparing determines if the first pixel value is within the at least one luminance range;
   compare the first pixel value to at least one chrominance range in response to determining that the first pixel value is within the at least one luminance range, wherein the at least one chrominance range is determined based on the at least one luminance range, and wherein said comparing determines if the first pixel value is within the at least one chrominance range;
   store information indicating that the first pixel is within the at least one luminance range and the at least one chrominance range;
   wherein said program instructions executable to perform said comparing and said storing information are executable a plurality of times for a plurality of pixel values;
   wherein the information indicates how many pixel values of the plurality of pixel values are within the at least one luminance range and the at least one chrominance range;
   determine whether the information indicates that greater than a predetermined percentage of the plurality of pixel values are in the at least one luminance range and the at least one chrominance range;
   adjust, in response to determining that greater than the predetermined percentage of the plurality of pixel values are in the at least one luminance range and the at least one chrominance range, at least one pixel value in the memory by a ratio which results in at least one chrominance value of the adjusted pixel value being closer to a predetermined chrominance value.

16. The computer readable memory medium of claim 15, wherein if the information does not indicate that a percentage of the plurality of pixel values that is greater than a predetermined percentage are in the at least one luminance range and the one or more corresponding chrominance ranges, no adjustment is made to the image based on the information.

17. The computer readable memory medium of claim 15, wherein pixel values of the plurality of pixel values which are not in any of the plurality of luminance ranges are not used to adjust the image.

18. The computer readable memory medium of claim 15, wherein pixel values of the plurality of pixel values which are in a luminance range of the plurality of luminance ranges but are not in at least one chrominance range corresponding to the luminance range are not used to adjust the image.

19. The computer readable memory medium of claim 15, wherein the ratio equals a green sum of the pixel values in the plurality of the pixels divided by a red sum of the pixel values in the plurality of pixels.

20. The computer readable memory medium of claim 15, wherein the information indicating how many pixel values of the plurality of pixel values are within the at least one luminance range and the at least one chrominance range comprises at least one counter and values of pixels which resulted in the at least one counter being accumulated.

21. The computer readable memory medium of claim 15, wherein the predetermined percentage is calculated based on an exposure of a previous image in a video stream with the image.

* * * * *